US007822418B2

(12) United States Patent
Eklund et al.

(10) Patent No.: US 7,822,418 B2
(45) Date of Patent: Oct. 26, 2010

(54) DEVICE PLAYBACK USING RADIO TRANSMISSION

(75) Inventors: Jan-Erik Eklund, Linkoping (SE); Michael Lewis, London (GB)

(73) Assignee: Infineon Technologies AG, Neubiberg (DE)

( * ) Notice: Subject to any disclaimer, the term of this patent is extended or adjusted under 35 U.S.C. 154(b) by 747 days.

(21) Appl. No.: 11/748,447

(22) Filed: May 14, 2007

(65) Prior Publication Data

US 2008/0287065 A1 Nov. 20, 2008

(51) Int. Cl.
*H04W 4/00* (2009.01)

(52) U.S. Cl. ................. 455/434; 455/160.1; 455/154.2; 455/161.1; 370/203; 375/216

(58) Field of Classification Search ................. 455/434, 455/160.1, 154.2, 161.1, 164.1, 167.1; 370/203; 375/216
See application file for complete search history.

(56) References Cited

U.S. PATENT DOCUMENTS

| | | | | | |
|---|---|---|---|---|---|
| 5,054,119 | A | * | 10/1991 | Rolland | 455/346 |
| 5,220,682 | A | * | 6/1993 | Tomohiro | 455/161.2 |
| 5,457,816 | A | * | 10/1995 | Koyama | 455/161.2 |
| 5,581,576 | A | * | 12/1996 | Lanzetta et al. | 375/216 |
| 5,584,051 | A | * | 12/1996 | Goken | 455/68 |
| 5,745,845 | A | * | 4/1998 | Suenaga et al. | 455/194.1 |
| 5,819,166 | A | * | 10/1998 | Kimura et al. | 455/186.1 |
| 5,857,156 | A | * | 1/1999 | Anderson | 455/517 |
| 5,898,910 | A | * | 4/1999 | Miyake et al. | 455/186.1 |
| 5,991,601 | A | * | 11/1999 | Anderson | 340/7.1 |
| 6,154,504 | A | * | 11/2000 | Ino | 375/265 |
| 6,163,711 | A | * | 12/2000 | Juntunen et al. | 455/557 |
| 6,526,284 | B1 | * | 2/2003 | Sharp et al. | 455/456.6 |
| 6,961,548 | B2 | * | 11/2005 | Groeger et al. | 455/161.1 |
| 7,269,396 | B2 | * | 9/2007 | Vogt et al. | 455/135 |
| 7,328,161 | B2 | * | 2/2008 | Oh | 704/500 |
| 2003/0153292 | A1 | * | 8/2003 | Groeger et al. | 455/221 |
| 2004/0008615 | A1 | * | 1/2004 | Oh | 370/203 |
| 2005/0094984 | A1 | * | 5/2005 | Schramel et al. | 386/125 |
| 2005/0266843 | A1 | * | 12/2005 | Shimominami et al. | 455/432.3 |
| 2006/0080103 | A1 | * | 4/2006 | Van Breemen | 704/270 |
| 2006/0123328 | A1 | * | 6/2006 | Tonami et al. | 714/801 |
| 2006/0223467 | A1 | * | 10/2006 | Mason | 455/185.1 |
| 2006/0292980 | A1 | * | 12/2006 | Marcos Alba | 455/3.06 |
| 2007/0070677 | A1 | * | 3/2007 | Shin | 365/78 |
| 2007/0127734 | A1 | * | 6/2007 | Brulle-Drews | 381/86 |
| 2009/0010213 | A1 | * | 1/2009 | Yamada et al. | 370/329 |
| 2009/0037166 | A1 | * | 2/2009 | Wang | 704/200.1 |
| 2009/0054020 | A1 | * | 2/2009 | Mason | 455/127.5 |
| 2009/0221244 | A1 | * | 9/2009 | VanHarlingen et al. | 455/103 |
| 2009/0257602 | A1 | * | 10/2009 | Darby et al. | 381/86 |
| 2009/0258647 | A1 | * | 10/2009 | Yamada et al. | 455/435.1 |
| 2009/0275299 | A1 | * | 11/2009 | Buch et al. | 455/161.1 |
| 2009/0300508 | A1 | * | 12/2009 | Krampf et al. | 715/739 |

* cited by examiner

*Primary Examiner*—Minh D Dao
(74) *Attorney, Agent, or Firm*—SpryIP, LLC

(57) ABSTRACT

Implementations related to media playback and storage devices are presented herein.

17 Claims, 4 Drawing Sheets

DEVICE PLAYBACK USING RADIO TRANSMISSION

BACKGROUND

The proliferated use of digital storage devices to playback audio, video and other media types has generally resulted in a shift away from conventional medium types, such as audio tapes, compact disks, and the like. One such digital storage device is the MPEG Audio Layer 3 (MP3) player. An MP3 player may be capable of storing digital audio encoded in a lossy compression format. This lossy compression format is designed to greatly reduce the amount of data required to represent audio, yet still sound like a faithful reproduction of the original uncompressed audio to most listeners.

Many digital storage devices that incorporate playback functionality require the use of a Digital Rights Management (DRM) system that is designed to prevent unauthorized copying of stored media. Thus, although many such storage devices are portable, the media stored on the storage devices normally has limited portability. Therefore, ensuring that these playback devices can be interfaced with varying types of output devices, such as televisions, and stereos, may be desirable.

One conventional way of interfacing a digital storage device, such as an MP3 player, with a stereo or other like device is accomplished using radio transmission. Assuming the digital storage device implements transmitting technology, a user may configure the storage device to enable playback of audio using a radio tuner enabled stereo. This is accomplished by modulating and transmitting audio produced by the storage device on a carrier frequency that is not being utilized by a licensed broadcasting entity. A user then tunes a radio receiving device to the carrier frequency to hear playback of the transmitted audio. In the event that the carrier frequency is later used by a licensed transmission, manual retuning and configuration of the digital storage and the radio receiving devices are generally required.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

At least one or more implementations described herein relate to wireless playback of media associated with a digital storage device, such as an MPEG Audio Layer 3 (MP3) player. According to at least one implementation, an MP3 player may include a frequency modulation (FM) receiver and transmitter that are capable of communicating with a device capable of at least audio playback, such as an automobile stereo incorporating an FM receiver. The radio technology of the MP3 player and the automobile stereo may be able to transmit and receive data in addition to radio frequency (RF) signals.

In one implementation described herein, a digital storage device scans an RF band for unused/free frequencies, also known as unused/free channels. Such free frequencies may be those that are not being used by a licensed broadcasting entity. Alternatively, the free frequencies may be those that do not have an assigned unique data code. This so-called unique data code will be described in further detail herein.

The digital storage device may collect and store one or more detected unused/free frequencies. The digital storage device may select one of the stored frequencies to transmit modulated audio media stored in the device. The selected one of the stored frequencies may be assigned a randomly, but unique, generated data code. This unique data code may be transmitted with the modulated audio media stored in the device.

Transmission of audio media and an associated unique data code may be received by an automobile stereo having an FM receiver. The transmission may also include data that identifies the digital storage device that is communicating the modulated audio. This data may be displayed on a display associated with the automobile stereo. When the automobile stereo is tuned to the selected one of the stored frequencies, the data may be displayed to indicate that the digital storage device is transmitting on the selected frequency.

The automobile stereo may also receive additional frequencies from the digital storage device, where each of these additional frequencies may have an assigned common unique data code. If the digital storage device changes to a different carrier frequency, and the different carrier frequency has an associated unique data code that is equal to a unique data code of a carrier frequency tuned to by the automobile stereo, the automobile stereo may automatically tune to the different frequency carrier. This different frequency carrier may be one of the additional frequencies received from the digital storage device. This may significantly reduce having to tune and retune the automobile stereo when the digital storage device changes to a different carrier frequency, due to interference, the presence of a licensed transmission, and the like. This may be beneficial during operation of an automobile associated with the stereo.

Exemplary Arrangements

Figure 1:
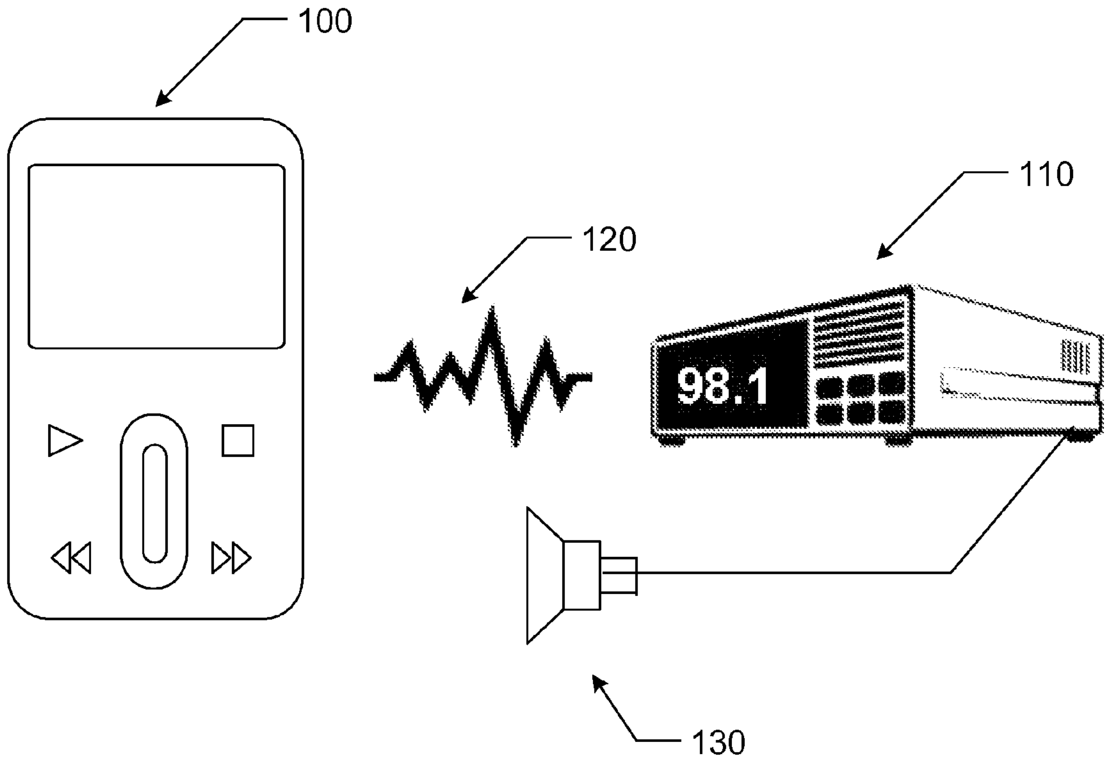
FIG. 1 is a diagram illustrating a media playback and storage device in communication with a media playback device. Both devices have radio communication functionality.

FIG. 1 illustrates a media playback and storage device 100 in communication with a media playback device 110. In one implementation, the media playback and storage device 100 is an MP3 player that includes RF communication technology. However, the media playback device 100 may be any device capable of delivering an output that is consumable by an entity, such as a human being. Such devices may include portable gaming devices, wireless phones, personal digital assistants (PDA), notebook computers, and other portable and/or stationary computing devices.

The media playback and storage device 100 may deliver content to the media playback device 110 over a wireless interface 120. In one implementation, the wireless interface 120 is realized using RF communications, such as an FM transmission from the media playback and storage device 100. Wireless communications standards other than FM transmission may also be used.

The media playback device 110 may be interfaced with an output device 130, such as loud speakers. The output device 130 may output audio signals received from the media playback and storage device 100 via the wireless interface 120. In one implementation, the audio signals may be carried by FM transmission and received by the media playback device 110, which is tuned to the frequency of the FM transmission.

The media playback device 110 may implement a receiver and transmitter capable of processing various data types carried on the wireless transmission 120. In an exemplary implementation, a wireless communication 120 from the media playback and storage device 100 may include audio signals for output by the media playback device 110, a unique data code that identifies the sender of the audio signals, alternative broadcast frequencies that the media playback and storage device 100 may use, and data to display on a display device of the media playback device 110. Such data to display on the display device may include data that identifies or names the media playback and storage device 100. More specifically, this data may be a machine readable representation that the media playback device 110 uses to display the model, name or type of device transmitting the modulated audio.

In one exemplary implementation, the media playback and storage device 100 and the media playback device 110 are enabled with Radio Data Service (RDS) and/or Radio Broadcast Data System (RBDS) technologies. Both technologies enable radio enabled devices to receive/transmit audio signals that include addition data, such as station identifiers, alternative frequencies, traffic information, and other information relevant to a broadcast.

Both RDS and RBDS may use a Program Information (PI) code that contains information related to the country of the broadcasting station, frequencies of the broadcast station, and the coverage area, each of which being potentially useful for tuning to alternate frequencies for a same broadcast content. A tuner of the RDS enabled device may use the alternative frequencies associated with PI code information to proactively tune users' radios to new frequencies as they move in or out of broadcast coverage. RDS and RBDS also use a Program Service (PS) code. The PS code may be used to convey actual call letters or slogans of transmitting stations.

In one implementation, the media playback and storage device 100 uses RDS information to generate a list of frequencies that are not currently being used by a licensed transmission(s). Such a list may be generated by scanning a frequency band for frequencies that are not currently associated with a PI code. One or more such frequencies may be stored in a storage facility of the media playback and storage device 100 for use when transmitting media content for playback by way of the media playback device 110. The list of frequencies may be augmented or separately generated by scanning a frequency band and identifying frequencies for addition to the list. In one implementation, only those frequencies that have a minimal amount of signal strength and/or interference are chosen for inclusion in the list. In another implementation, only those frequencies that do not have an assigned unique data code, such as a PI code assigned to a frequency of a licensed broadcasting entity, are chosen for inclusion in the list.

In one implementation, the media playback and storage device 100 selects one of the frequencies that is not currently associated with a PI code, or such a frequency from a list of frequencies stored in the device 100, to carry media stored therein. In one example, the media playback and storage device 100 generates and assigns a unique data code, such as a PI code, to the selected frequency. The device 100 may communicate to the playback device 110 modulated audio using the chosen frequency, the unique data code, and data (e.g., a PS code) to display the name of the device 100 on a display of the playback device 110.

A user may manually tune the media playback device 110 to the utilized carrier frequency to enjoy playback of media output by the media playback and storage device 100. When the name of the media playback device 100 is displayed on a display of the playback device 110, made possible through the use of data (e.g., a PS code) transmitted by the playback device 100, the user may know when the playback device 110 is properly tuned to the carrier frequency of the media playback and storage device 100.

The media playback device 110 may proactively scan for frequencies that have the same unique data code as the carrier frequency being used by the media playback and storage device 100, to determine if one of those frequencies has a stronger signal than that of the currently tuned frequency. In the RDS and RBDS systems this is called Automatic Tuning (AF). A frequency with a stronger signal may occur when the media playback and storage device 100 detects interference on a currently used frequency and proactively switches to another frequency to avoid degradation of media output therefrom. The media playback device 110 may detect this change and automatically tune to the new transmitting frequency of the storage device 100.

Figure 2:
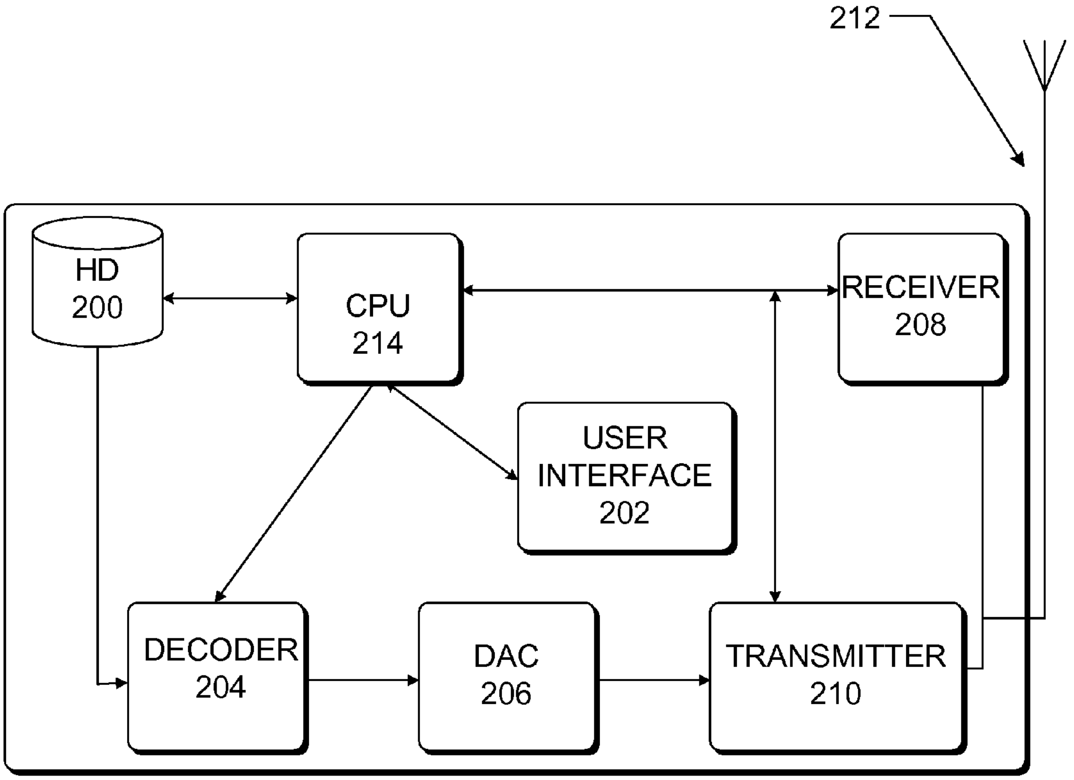
FIG. 2 illustrates a block diagram of various elements associated with a media playback and storage device.

FIG. 2 illustrates one implementation of the media playback and storage device 100. As is illustrated, the storage device 100 may include a hard drive 200. The hard drive 200 may store media that may be consumed/used by way of the storage device 100. In one implementation, the hard drive 200 includes audio media stored in digital form. This stored digital data may be compressed (e.g. MP3, WMA, Real Audio, etc.), uncompressed, or a combination of compressed and uncompressed data. The hard drive 200 may also include an updateable list of carrier frequencies that may be used to wireless transmit media to a playback device, such as the media playback device 110. The storage 200 may be nonvolatile memory, volatile memory alone, or a combination of nonvolatile and volatile memory.

A user interface 202, and the computer executable code to realize the interface 202, may be associated with the media playback and storage device 100. The user interface 202 may enable a user to select and consume media stored on the hard drive 200. The user interface 202 may also enable a user to configure the storage device 100. Generally, the user interface 202 enables a user to operate the media and playback storage device 100. The user interface 202 may be stored in memory of the media playback and storage device 100, such as the hard drive 200.

A decoder 204 to decode compressed data may be incorporated as part of the media and playback storage device 100. Such compressed data may be stored on the hard disk 200, or other memory or storage of the storage device 100. A digital to analog converter 206 may be coupled to the decoder 204 to provide analog conversion of digital signals produced by the decoder 204. Signals in analog form may be required by various components of the media and playback device 100. At least one such component may be radio related technologies of the media and playback storage device 100.

A receiver 208 and a transmitter 210 may be part of the media and playback storage device 100. Although shown in FIG. 2 as being two separate components, the receiver 208 and the transmitter 210 may be in the form of a single transceiver that has both receiving and transmitting functionality. The receiver 208 and the transmitter 210 may be coupled to an antenna 212 to enable reception and transmission of wireless communications. Such wireless communications may include reception and transmission of FM signals. In one implementation, the receiver 208 and the transmitter 210 are compatible with the RDS and/or RBDS systems discussed herein.

The media playback and storage device 100 may also include a central processing unit (CPU) 202. Generally, the CPU 202 provides processing and control functionality to the various components of the storage device 100. For example, the CPU 202 may control reads and writes performed by the hard drive 200; signal receiving and sending performed by the receiver 208 and transmitter 210, respectively; generate unique data codes and/or data for identifying the storage device 100, and carry out instructions received and control output to the user interface 202. The CPU may be preprogrammed to carryout the generation of the unique data codes and the data for identifying the storage device 100. Alternatively, the CPU may be instructed by computer readable instructions, such as those associated with an operating system, to enable generation of the unique data codes and the data for identifying the storage device 100. The foregoing is not an exhaustive list of those operations performed by the CPU 202.

The technology shown in FIGS. 1-2 is merely illustrative of a select few components that may be used to design the media playback and storage device 100 and the media playback device 110. Those of ordinary skill in the art appreciate many other component combinations may be used to develop the devices illustrated in the figures.

Procedure

The following discussion describes procedures that may be implemented utilizing the previously described implementations. Aspects of the procedures may be implemented in hardware, firmware, or software, or a combination thereof. The procedures are shown as a set of blocks that specify operations performed by one or more devices, and are not necessarily limited to the order shown for performing the operations by the respective blocks. In portions of the following discussion, reference may be made to the arrangements of FIGS. 1 and 2.

Figure 3:
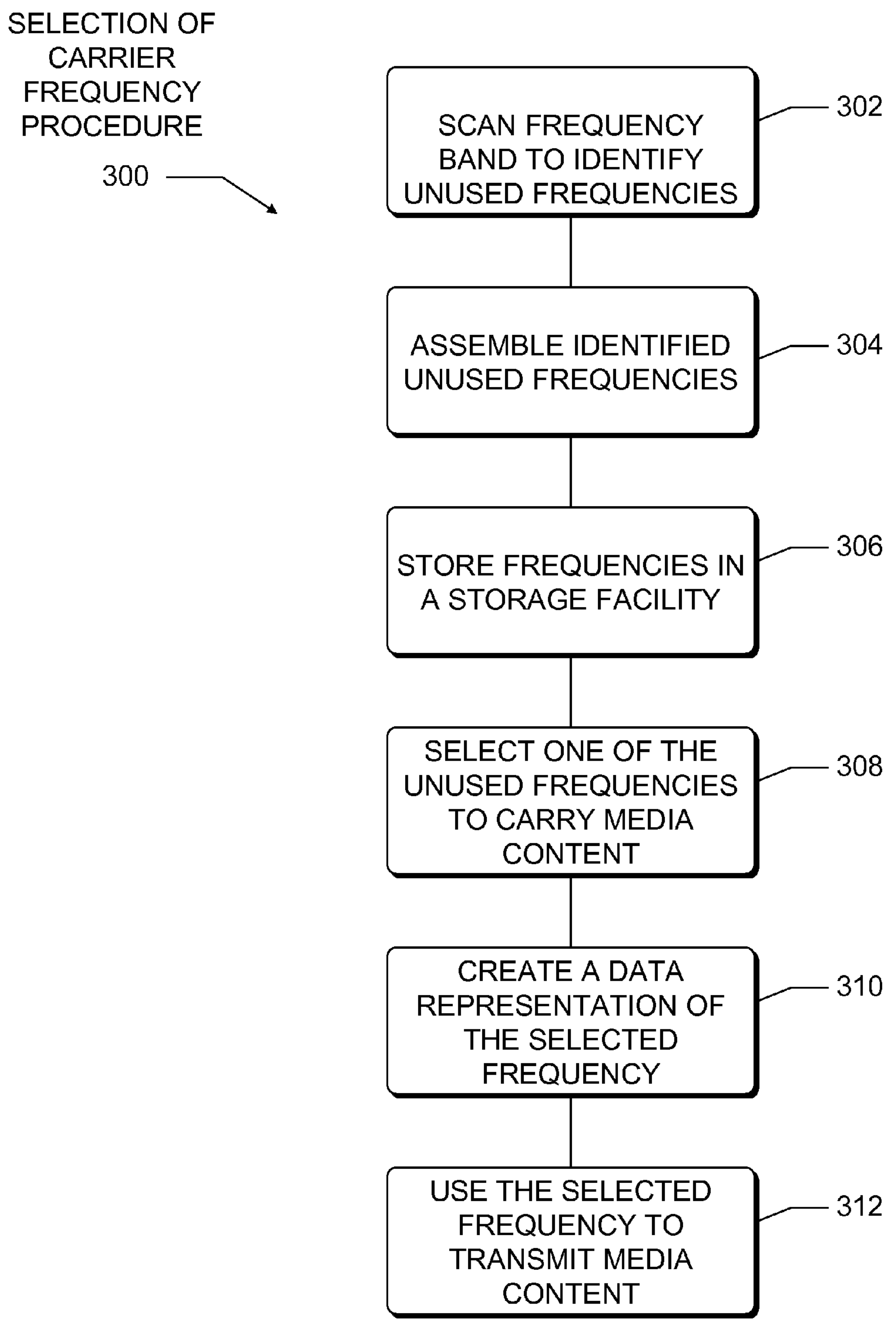
FIG. 3 shows an example procedure that enables selection of at least one carrier frequency to wirelessly transmit at least media content stored on a media playback and storage device.

FIG. 3 shows an example procedure 300 that enables selection of at least one carrier frequency usable to wirelessly transmit at least media content stored on a media playback and storage device, such as the storage device 100 illustrated in FIG. 1. The storage device 100 may be a portable MP3 player. The wirelessly transmitted device may be received and played-back by a playback device, such as the playback device 110. The playback device 110 may be a FM stereo housed in an automobile (not shown).

At block 302, a media playback and storage device, such as a digital music player, scans a frequency band for unused frequencies that may be used to carry audio signals. In one implementation, the digital music player scans an RF frequency band for frequencies that are not currently being used by a licensed FM broadcasting entity. Those frequencies may be identified by sweeping a bandwidth within the FM broadcasting range for frequencies that have less than a predetermined interference level. In another implementation, the digital music player scans an RF frequency band for frequencies that do not have an associated unique data identifier, such as a PI code. The digital music player may choose a plurality of those frequencies that do not have an associated unique data identifier for inclusion in a list of frequencies that are usable to carry audio signals. Alternatively, the digital music player may simply choose one of those frequencies to carry audio signals associated therewith.

At block 304, frequencies identified in block 302 may be assembled as a list of list of frequencies that are usable to carry audio signals. At block 306, the list of frequencies may be stored in a storage facility, such as nonvolatile and/or volatile memory, of the digital music player.

At block 308, the digital music player selects one of the frequencies in the list as a carrier for audio content stored on the digital music player. In one implementation, the digital music player selects a frequency from the list that has a least amount of interference, compared to the interference levels found on the other frequencies of the list. In another implementation, the digital music player randomly selects a frequency from the list. In yet another implementation, the digital music player selects the first frequency in the list. In yet another implementation, the digital music player simply selects a frequency after scanning an RF frequency band for frequencies that are not currently being used by a licensed FM broadcasting entity (block 302).

At block 310, the digital music player creates a data representation for identifying the digital music player and that may be displayed on a display device of a receiver, such as the playback device 110. In one implementation, the data representation is embodied as a PS code that an RDS and/or RBDS enabled playback device is capable of processing and displaying on a display device thereof. The data representation may be processed by the playback device to display a name, model, or the like of the digital music player. This allows a user of playback device to easily identify when the playback device is properly tuned to the frequency of the RF carrier.

At block 312, the digital music player transmits audio content to the playback device using the frequency chosen at block 308. At block 312, the digital music player may also assign and transmit a unique data code, such as a PI code, associated with the chosen frequency to the playback device.

Figure 4:
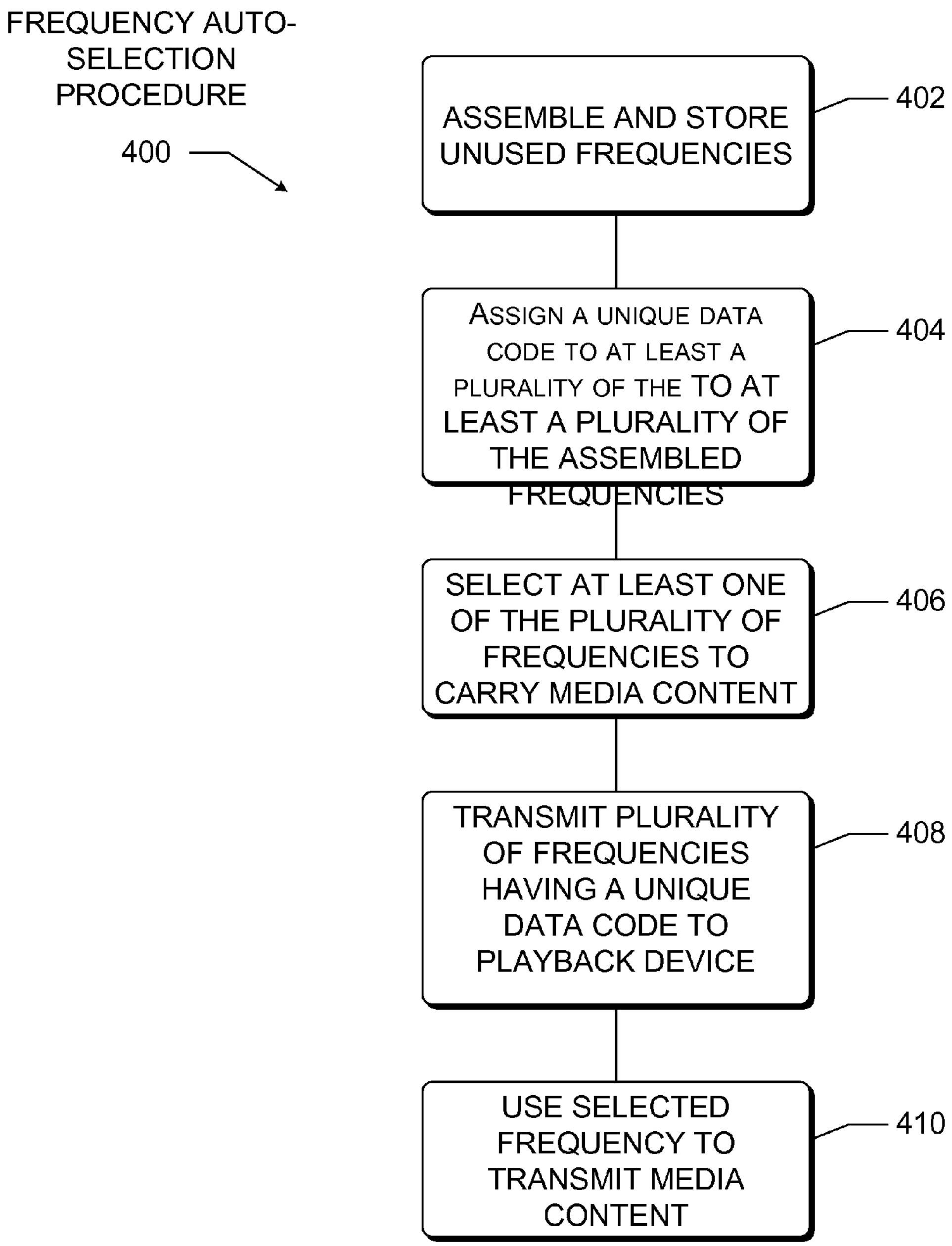
FIG. 4 shows an example procedure that enables selection of at least a plurality of carrier frequencies that may be used to transmit at least media content stored on a media playback and storage device.

FIG. 4 shows an example procedure 400 that enables selection of at least a plurality of carrier frequencies that may be used to transmit at least media content stored on a media playback and storage device, such as the storage device 100 illustrated in FIG. 1. The wirelessly transmitted media content may be received and played-back by a playback device, such as the playback device 110. The playback device 110 may be an FM stereo housed in an automobile (not shown). The storage device 100 may be a portable MP3 player. The plurality of carrier frequencies may also be stored in the playback device 110 and used to auto-tune to another frequency of the plurality when necessary.

At block 402, a media and playback and storage device assembles and stores a plurality of unused frequencies. A media playback and storage device, such as a digital music player, scans a frequency band for unused frequencies that may be used to carry audio signals. In one implementation, the digital music player scans a frequency band for frequencies that are not currently being used by a licensed FM broadcasting entity. Those frequencies may be identified by sweeping a bandwidth within the FM broadcasting range for frequencies that have less than a predetermined interference level. In another implementation, the digital music player scans an RF frequency band for frequencies that do not have an associated unique data identifier, such as a PI code.

The digital music player may choose a plurality of those frequencies that do not have an associated unique data identifier for inclusion in a list of frequencies that are usable to carry audio signals. Identified frequencies may be assembled as a list of frequencies that are usable to carry audio signals. The list of frequencies may be stored in a storage facility, such as nonvolatile and/or volatile memory, of the digital music player.

At block 404, the digital music player may assign a unique data code to at least one of the at least a plurality of the identified frequencies. In one implementation, the unique data code is randomly generated, but the randomly generated code is generated based on knowledge of other unique data codes that are assigned to frequencies used by licensed broadcasting entities. In particular, the randomly generated unique code should not match other unique data codes that are assigned to frequencies used by licensed broadcasting entities. In another implementation, a unique data code is generated that does not match a PI code used by a licensed broadcasting entity.

At block 406, the digital music player selects one of the frequencies in the list as a carrier for audio content stored on the digital music player. In one implementation, the digital music player selects a frequency from the list that has a least amount of interference, as compared to the interference levels found on the other frequencies of the list. In another implementation, the digital music player randomly selects a frequency from the list. In yet another implementation, the digital music player selects the first frequency in the list. In yet another implementation, the digital music player simply selects a frequency after scanning an RF frequency band for frequencies that are not currently being used by a licensed FM broadcasting entity.

At block 408, the digital music player transmits a plurality of frequencies having an assigned unique data code and the unique code to the playback device. In one implementation, the unique data code is a PI code that allows an RDS and/or RBDS enabled device to auto-select or retune to frequencies that have a common PI code. In another implementation, the digital music player transmits a single frequency having an assigned unique data code and the unique code to the playback device. An RDS and/or RBDS enabled device may use associated AF functionality to search for other frequencies having the same PI code, should retuning become necessary due to signal loss, interference, and the like.

More specifically, this auto-select or retune functionality may be useful if the digital music player changes to a different carrier frequency. The playback device may detect such a change in frequency by periodically evaluating the signal quality of a modulated signal carried by a currently tuned frequency. In the case of audio from the digital music player, if the digital music player has switched to a different carrier frequency, the modulated signal will not be present on the currently tuned frequency. This may trigger the playback device to scan for other frequencies that have the same unique data code, or PI code in one implementation, as the unique data code associated with the currently tuned frequency. The playback device may auto-select or auto-tune to the frequency that has the highest signal strength, lowest interference level, or the like. In the case of an RDS and/or RBDS enabled device, AF functionality may be used to tune to a frequency having a common PI as that of the currently tuned frequency.

At block 410, the digital music player transmits audio content to the playback device using the frequency chosen at block 406. The transmission may also include a unique data code and additional data for display to identify a name of the digital music player, such as a PI code and a PS code, respectively.

Enhancements

In one implementation, a media playback and storage device may transmit audio content that has predetermined intervals of low volume or silence. Such low volume or silent intervals often occur between songs produced by recording artists. The device may use these low volume or silence intervals to determine if an RF carrier currently used by the device has interference, or if a licensed broadcasting entity is transmitting on the RF carrier used by the device. If interference and/or a broadcast is present on the RF carrier, the media playback and storage device may select another RF carrier to transmit audio content. In one implementation, the selected another RF carrier may be assigned a unique data code or PI code that is the same as the one assigned to the RF carrier currently used by the media playback and storage device. This may enable a playback device receiving the audio content transmitted by media playback and storage device to auto-tune to the selected another RF carrier.

In another implementation, a media playback and storage device may use intervals of low volume or silence in an audio transmission from the media playback and storage device to scan for additional frequencies that have minimal interference and/or that are not being use by a licensed broadcasting entity. The additional frequencies may be added to a list of available frequencies for audio content transmission that is maintained in a storage facility of the media playback and storage device. In an implementation, the additional frequencies may be assigned a unique data code already assigned to frequencies stored in the media playback and storage device, and transmitted to a playback device, such as an automobile stereo/radio. The playback device may use the additional frequencies to augment stored frequencies that may be used by auto-tuning technology (e.g., AF functionality) of the playback device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method to enable playback of media content associated with a media storage device, comprising:

scanning a frequency band to identify at least one frequency;

storing at least one identified frequency in a media playback and content storage device;

generating a unique data code to associate with the stored at least one identified frequency;

transmitting content associated with the media playback and content storage device and the unique data code using the at least one identified frequency as a carrier; and generating a data representation, the data representation being machine readable to display information related to the media playback and content storage device.

2. The method to enable playback of media content associated with a media storage device according to claim 1, wherein the unique data code is a Program Information (PI) code.

3. The method to enable playback of media content associated with a media storage device according to claim 1, wherein the media playback and content storage device stores audio content, the transmitted content being at least a portion of the audio content stored in the media playback and content storage device.

4. The method to enable playback of media content associated with a media storage device according to claim 1, wherein the scanning identifies a plurality of frequencies and the storing stores the plurality of frequencies in the media playback and content device.

5. The method to enable playback of media content associated with a media storage device according to claim 4, wherein the transmitting transmits the content and the unique data code on a frequency chosen from the plurality of frequencies.

6. The method to enable playback of media content associated with a media storage device according to claim 1, wherein the scanning includes scanning a frequency band to identify at least one frequency without an assigned unique data code.

7. The method to enable playback of media content associated with a media storage device according to claim 6, wherein the assigned unique data code is a Program Information (PI) code.

8. The method to enable playback of media content associated with a media storage device according to claim 1, further comprising transmitting the data representation together with the content associated with the media playback and content storage device and the unique data code.

9. The method to enable playback of media content associated with a media storage device according to claim 8, wherein the unique data code is a Program Information (PI) code and the data representation is a Program Service (PS) code.

10. The method to enable playback of media content associated with a media storage device according to claim 1, wherein content associated with the media playback and content storage device and the unique data code are transmitted together and substantially simultaneously using the at least one identified frequency as a carrier.

11. A method to enable playback of media content associated with a media storage device, comprising:

storing a plurality of frequencies in a digital media playback and content storage device;

generating a data code, the generated data code being a Program Information (PI) code;

assigning the data code to at least two frequencies of the stored plurality of frequencies;

transmitting the at least two of the plurality of frequencies and the assigned data code, the transmitted frequencies and the assigned data code to be received by a receiving device; and transmitting content associated with the digital media playback and content storage device using one of the transmitted at least two frequencies.

12. The method to enable playback of media content associated with a media storage device according to claim 11, further comprising scanning a frequency band range to identify frequencies that are without a unique data code that identifies frequency use by a broadcasting entity.

13. The method to enable playback of media content associated with a media storage device according to claim 12, wherein the scanning scans the frequency band to identify frequencies that are without a Program Information (PI) code.

14. An media playback and storage apparatus, comprising:

a receiver to scan a frequency band to identify at least one frequency; a storage to store at least one identified frequency;

a processor to generate a unique data code to associate with the stored at least one identified frequency, the unique data code being a Program Information (PI) code; and a transmitter to transmit content associated with the media playback and storage apparatus and the unique data code using the at least one identified frequency as a carrier.

15. The media playback and storage apparatus according to claim 14, wherein the receiver and transmitter are enabled with Radio Data Service (RDS) or Radio Broadcast Data System (RBDS) technology.

16. The media playback and storage apparatus according to claim 14, wherein the storage includes at least one identified frequency stored therein that does not have a Program Information (PI) code associated therewith.

17. The media playback and storage apparatus according to claim 14, wherein the storage stores audio content in a digital format.

* * * * *